(12) United States Patent
You

(10) Patent No.: US 10,860,030 B2
(45) Date of Patent: Dec. 8, 2020

(54) DEEP LEARNING-BASED AUTONOMOUS VEHICLE CONTROL DEVICE, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventor: Byung Yong You, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 789 days.

(21) Appl. No.: 15/615,971

(22) Filed: Jun. 7, 2017

(65) Prior Publication Data

US 2018/0275657 A1    Sep. 27, 2018

(30) Foreign Application Priority Data

Mar. 27, 2017    (KR) .................... 10-2017-0038405

(51) Int. Cl.
| | | |
|---|---|---|
| *G05D 1/02* | (2020.01) | |
| *G05B 23/02* | (2006.01) | |
| *G06N 3/04* | (2006.01) | |

(52) U.S. Cl.
CPC ....... *G05D 1/0221* (2013.01); *G05B 23/0229* (2013.01); *G05B 23/0294* (2013.01); *G06N 3/0454* (2013.01); *G05D 2201/0213* (2013.01); *G06N 3/0427* (2013.01)

(58) Field of Classification Search
CPC .............. G05D 1/0221; G05B 23/0229; G05B 23/0294; G06N 3/0454; G06N 2201/0213; G06N 3/0427
See application file for complete search history.

(56) References Cited

U.S. PATENT DOCUMENTS

| | | | |
|---|---|---|---|
| 2007/0156294 A1 | 7/2007 | Tipping et al. | |
| 2015/0189241 A1 | 7/2015 | Kim et al. | |
| 2016/0023664 A1 | 1/2016 | Graham | |
| 2016/0207523 A1 | 7/2016 | Kotsuji et al. | |
| 2016/0313735 A1* | 10/2016 | Berkemeier | G05D 1/0212 |
| 2018/0173240 A1* | 6/2018 | Fang | G06N 3/0445 |

FOREIGN PATENT DOCUMENTS

| | | |
|---|---|---|
| JP | 2015-055338 A | 3/2015 |
| KR | 10-2015-0076627 A | 7/2015 |

* cited by examiner

*Primary Examiner* — Austin Hicks
(74) *Attorney, Agent, or Firm* — Morgan, Lewis & Bockius LLP

(57) ABSTRACT

A deep learning-based autonomous vehicle control system includes: a processor determining an autonomous driving control based on deep learning, correcting an error in determination of the deep learning-based autonomous driving control based on determination of an autonomous driving control based on a predetermined expert rule, and controlling an autonomous vehicle; and a non-transitory computer-readable storage medium storing data for the determination of the deep learning-based autonomous driving control, data for the determination of the expert rule-based autonomous driving control, and information about the error in the determination of the deep learning-based autonomous driving control.

18 Claims, 9 Drawing Sheets

| EXPERT RULES | DETAILS | ILLUSTRATION |
|---|---|---|
| 1. LIMITATION ON STEERING DIRECTION WITH RESPECT TO FREE SPACE | -PREVENT OUTPUT OF STEERING VALUE IN DIRECTION IN WHICH THERE IS NO FREE SPACE | |
| 2. LIMITATION ON MINIMUM TIME TO COLLISION (TTC) | -DEFINE MINIMUM TTC AND PREVENT STEERING OR ACCELERATION/ DECELERATION OUTPUT IN WHICH CURRENT TTC IS LESS THAN PREDETERMINED TTC | |
| 3. LIMITATION ON DEGREE OF CHANGE IN STEERING | -DEFINE DEGREE OF CHANGE IN STEERING FOR SAMPLE TIME AND PREVENT INSTANTANEOUS OUTPUT OF EXCESSIVE STEERING VALUE | |
| 4. LIMITATION ON DEGREE OF CHANGE IN ACCELERATION/DECELERATION | -DEFINE DEGREE OF CHANGE IN ACCELERATION/DECELERATION VALUE FOR SAMPLE TIME AND PREVENT INSTANTANEOUS OUTPUT OF EXCESSIVE ACCELERATION/DECELERATION VALUE | |
| 5. LIMITATION ON LANE DEPARTURE | -RECOGNIZE LANE NUMBER AND PREVENT STEERING OUTPUT FOR LANE DEPARTURE WHEN VEHICLE IS DRIVING ON LAST LANE, I.E., LEFTMOST LANE OR RIGHTMOST LANE | |

FIG. 6

DEEP LEARNING-BASED AUTONOMOUS VEHICLE CONTROL DEVICE, SYSTEM INCLUDING THE SAME, AND METHOD THEREOF

CROSS-REFERENCE TO RELATED APPLICATION

This application is based on and claims the benefit of priority to Korean Patent Application No. 10-2017-0038405, filed on Mar. 27, 2017, in the Korean Intellectual Property Office, the disclosure of which is incorporated herein in its entirety by reference.

TECHNICAL FIELD

The present disclosure relates to a deep learning-based autonomous vehicle control device, a system including the same, and a method thereof, and more particularly, to a technology for controlling an autonomous vehicle based on a predetermined expert rule to prevent an error in determination of deep learning-based autonomous vehicle control.

BACKGROUND

Recently, deep learning has drawn much attention for control of an autonomous vehicle as well as automatic recognition.

Such deep learning uses neural networks, and is being actively applied to fields of image recognition and classification and is combined with reinforcement learning and the like to show high performance beyond human ability in specific fields. Based on enhanced learning capability, without preprocessing of sensors, deep learning is being applied to a variety of fields such as autonomous vehicles.

In deep learning, however, only learning results appear as output, and thus there is a difficulty in debugging with respect to erroneous output. In particular, there is no room for error in determination and control of autonomous vehicles, and the impossibility of debugging in deep learning is considered a big risk.

SUMMARY

The present disclosure has been made to solve the above-mentioned problems occurring in the prior art while advantages achieved by the prior art are maintained intact.

An aspect of the present disclosure provides a deep learning-based autonomous vehicle control device, a system including the same, and a method thereof, which are designed to control autonomous driving while taking expert rules into account in deep learning-based autonomous driving control, thereby minimizing errors in determination of deep learning-based autonomous vehicle control.

The technical problem to be solved by the present inventive concept is not limited to the aforementioned problem, and any other technical problems not mentioned herein will be clearly understood from the following description by those skilled in the art to which the present disclosure pertains.

According to an aspect of the present disclosure, a deep learning-based autonomous vehicle control system includes: a processor determining an autonomous driving control based on deep learning, correcting an error in determination of the deep learning-based autonomous driving control based on determination of an autonomous driving control based on a predetermined expert rule, and controlling an autonomous vehicle; and a non-transitory computer-readable storage medium storing data for the determination of the deep learning-based autonomous driving control, data for the determination of the expert rule-based autonomous driving control, and information about the error in the determination of the deep learning-based autonomous driving control.

The processor may be further configured to: output a deep learning-based autonomous driving control output value for the deep learning-based autonomous driving control; output an expert rule-based autonomous driving control output value based on the expert rule; and compare the deep learning-based autonomous driving control output value with the expert rule-based autonomous driving control output value and outputting a final autonomous driving control output value depending on a comparison result.

The processor may output the deep learning-based autonomous driving control output value as the final autonomous driving control output value when the deep learning-based autonomous driving control output value and the expert rule-based autonomous driving control output value match.

The processor may output the expert rule-based autonomous driving control output value as the final autonomous driving control output value unless the deep learning-based autonomous driving control output value and the expert rule-based autonomous driving control output value match.

The expert rule may include at least one of limitations on steering direction with respect to free space, time to collision (TTC), degree of change in steering, degree of change in acceleration/deceleration, and lane departure.

When the deep learning-based autonomous driving control output value corresponds to a steering direction control in a direction in which there is no free space, the processor may correct the steering direction control to a direction in which there is free space.

When the deep learning-based autonomous driving control output value corresponds to a steering or acceleration/deceleration output control less than a predetermined minimum time to collision (TTC), the processor may stop the steering or acceleration/deceleration output control less than TTC.

When the deep learning-based autonomous driving control output value corresponds to a steering value greater than a predetermined steering reference value, the processor may adjust the steering value to be less than the steering reference value.

When the deep learning-based autonomous driving control output value corresponds to an acceleration/deceleration value greater than a predetermined acceleration/deceleration reference value, the processor may adjust the acceleration/deceleration value to be less than the acceleration/deceleration reference value.

When the deep learning-based autonomous driving control output value corresponds to an output value for a steering control in a direction departing from a lane, the processor may stop the steering control.

The processor may further control the autonomous vehicle using the final autonomous driving control output value that is output.

The deep learning-based autonomous driving control output value may include at least one of a relative speed between a preceding vehicle and a subject vehicle, a relative distance between the preceding vehicle and the subject vehicle, free space on a neighboring lane, a distance to a left lane, a distance to a right lane, a lane number of a lane on which the subject vehicle is currently driving, and an angle between a lane and the subject vehicle.

The non-transitory computer-readable storage medium may include: a deep learning storage storing a deep learning-based output control parameter for the determination of the deep learning-based autonomous driving control; an expert rule storage storing the expert rule; and an error storage storing information about the error that is determined and corrected by the processor.

According to another aspect of the present disclosure, a deep learning-based autonomous vehicle control device includes a process configured to: output a deep learning-based autonomous driving control output value for a deep learning-based autonomous driving control; output an expert rule-based autonomous driving control output value based on an expert rule; compare the deep learning-based autonomous driving control output value with the expert rule-based autonomous driving control output value and outputting a final autonomous driving control output value depending on a comparison result; and control an autonomous vehicle using the final autonomous driving control output value that is output.

The processor may output the deep learning-based autonomous driving control output value as the final autonomous driving control output value when the deep learning-based autonomous driving control output value and the expert rule-based autonomous driving control output value match.

The processor may output the expert rule-based autonomous driving control output value as the final autonomous driving control output value unless the deep learning-based autonomous driving control output value and the expert rule-based autonomous driving control output value match.

According to another aspect of the present disclosure, a deep learning-based autonomous vehicle control method includes: outputting a deep learning-based autonomous driving control output value for a deep learning-based autonomous driving control; outputting an expert rule-based autonomous driving control output value based on an expert rule; comparing the deep learning-based autonomous driving control output value with the expert rule-based autonomous driving control output value and outputting a final autonomous driving control output value depending on a comparison result; and controlling an autonomous vehicle using the final autonomous driving control output value.

The outputting of the final autonomous driving control output value may include outputting the deep learning-based autonomous driving control output value as the final autonomous driving control output value when the deep learning-based autonomous driving control output value and the expert rule-based autonomous driving control output value match.

The outputting of the final autonomous driving control output value may include outputting the expert rule-based autonomous driving control output value as the final autonomous driving control output value unless the deep learning-based autonomous driving control output value and the expert rule-based autonomous driving control output value match.

The expert rule may include at least one of limitations on steering direction with respect to free space, time to collision (TTC), degree of change in steering, degree of change in acceleration/deceleration, and lane departure.

BRIEF DESCRIPTION OF THE DRAWINGS

The above and other objects, features and advantages of the present disclosure will be more apparent from the following detailed description taken in conjunction with the accompanying drawings:

FIG. 6 illustrates a table showing expert rules for autonomous vehicle control, according to exemplary embodiments of the present disclosure.

DETAILED DESCRIPTION

Figure 1:
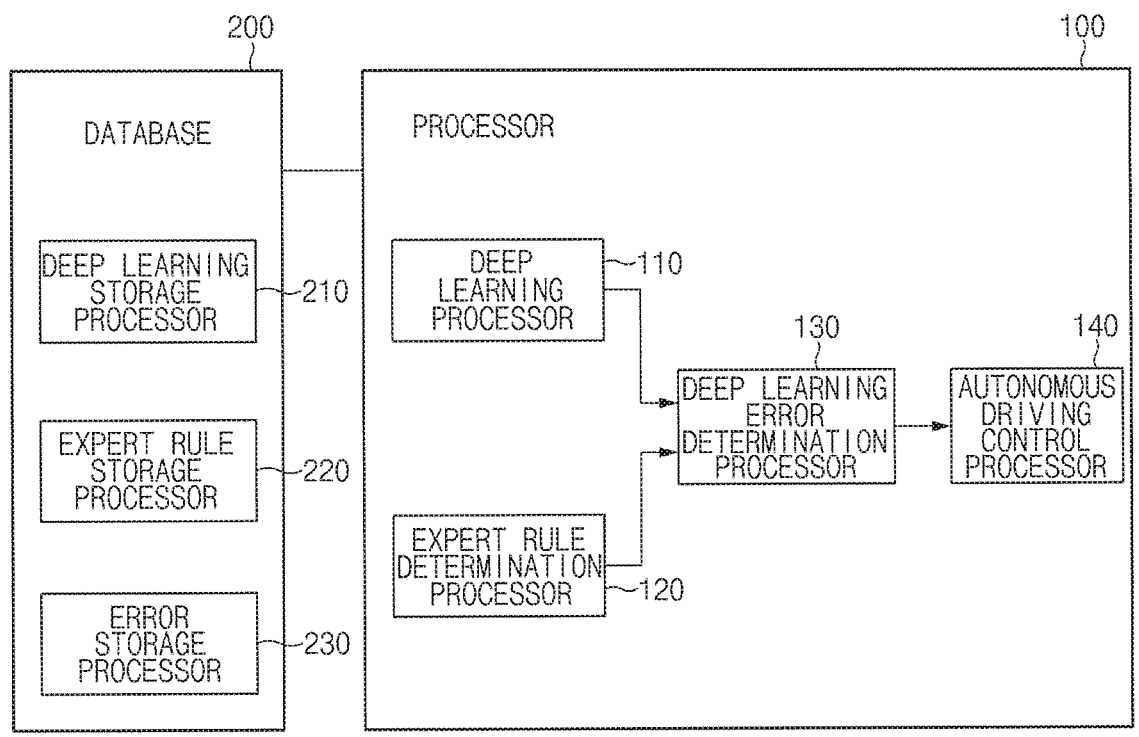
FIG. 1 illustrates the configuration of a deep learning-based autonomous vehicle control system, according to exemplary embodiments of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of a related known function or configuration will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, exemplary embodiments of the present disclosure will be described in detail with reference to FIGS. 1 to 7.

FIG. 1 illustrates the configuration of a deep learning-based autonomous vehicle control system, according to exemplary embodiments of the present disclosure.

The deep learning-based autonomous vehicle control system, according to the exemplary embodiments of the present disclosure, includes a processor 100 and a non-transitory computer-readable storage medium 200.

When the system determines the autonomous driving control of an autonomous vehicle based on deep learning, the processor 100 may correct an error in determination of the deep learning-based autonomous driving control on the basis of determination of autonomous driving control based on a predetermined expert rule to thereby control the autonomous vehicle. In other words, when performing the deep learning-based autonomous driving control of the autonomous vehicle, the processor 100 may compare a deep learning-based autonomous vehicle control output value with an expert rule-based determination value and prioritize the expert rule-based determination value when the deep learning-based autonomous vehicle control output value and the expert rule-based determination value do not match, thereby controlling the autonomous vehicle.

To this end, the processor 100 includes a deep learning processor 110, an expert rule determination processor 120, a deep learning error determination processor 130, and an autonomous driving control processor 140. The processor 100 may be implemented by a combination of hardware and software installed on the hardware and programmed to execute a predetermined operation. The hardware may include at least one processor and a memory.

In detail, the various embodiments disclosed herein, including embodiments of the deep learning-based autonomous vehicle control system and/or elements thereof, can be implemented using one or more processors coupled to a memory (or other non-transitory machine readable recording medium) storing computer-executable instructions for causing the processor(s) to perform the functions described above including the functions described. The processor 100 and/or elements thereof also can be implemented using one or more processors coupled to a memory (or other non-transitory machine readable recording medium) storing computer-executable instructions for causing the processor(s) to perform the functions described above including the functions described in relation to the deep learning processor 110, the expert rule determination processor 120, the deep learning error determination processor 130, and the autonomous driving control processor 140.

The deep learning processor 110 may perform deep learning using data previously stored through artificial neural networks to output a control signal for autonomous vehicle control.

The deep learning processor 110 may previously set a deep learning architecture in the initial stage and set a deep learning-based output control parameter. Here, the setting of the deep learning architecture refers to setting the number of hidden layers, the number of convolutional neural networks (CNNs), and the like, and the deep learning-based output control parameter refers to an output control value for autonomous vehicle control.

Table 1 below shows examples of the deep learning-based output control parameter. Here, the deep learning-based output control parameter refers to a deep learning-based autonomous driving control output value.

TABLE 1

| Output Parameters | V_pre | P_pre | Free_Space | Lane_Left | Lane_Right | Lane_num | Heading |
|---|---|---|---|---|---|---|---|
| Details | relative speed between preceding vehicle and subject vehicle | relative distance between preceding vehicle and subject vehicle | free space (available driving space) on neighboring lane | distance to left lane | distance to right lane | lane number of currently driving lane | angle between lane and subject vehicle |

Referring to table 1, the deep learning-based output control parameter includes at least one of a relative speed between a preceding vehicle and a subject vehicle, a relative distance between the preceding vehicle and the subject vehicle, free space (available driving space) on a neighboring lane, a distance to a left lane, a distance to a right lane, a lane number of a lane on which the subject vehicle is currently driving, and an angle between a lane and the subject vehicle. However, the present inventive concept is not limited to the deep learning-based output control parameters described in table 1, and all parameters available for deep learning-based recognition may be included.

The expert rule determination processor 120 may output an expert rule-based autonomous driving control output value based on a predetermined expert rule. Here, the expert rule includes at least one of limitations on steering direction with respect to free space, time to collision (TTC), the degree of change in steering, the degree of change in acceleration/deceleration, and lane departure, as illustrated in FIG. 6. FIG. 6 illustrates a table showing expert rules for autonomous vehicle control, according to exemplary embodiments of the present disclosure.

When the deep learning-based autonomous driving control output value and the expert rule-based autonomous driving control output value match, the deep learning error determination processor 130 may output the deep learning-based autonomous driving control output value as a final autonomous driving control output value.

When the deep learning-based autonomous driving control output value and the expert rule-based autonomous driving control output value do not match, the deep learning error determination processor 130 may output the expert rule-based autonomous driving control output value as a final autonomous driving control output value.

Referring to FIG. 6, when the deep learning-based autonomous driving control output value corresponds to a steering direction control in a direction in which there is no free space, the deep learning error determination processor 130 may correct the steering direction control to a direction in which there is free space. When the deep learning-based autonomous driving control output value for controlling the steering direction in a direction toward a space where there is another vehicle or an obstacle, rather than the free space, is output, the steering control may be stopped or may be corrected to the steering direction in which there is free space, and thus, a collision with a neighboring obstacle or vehicle may be prevented.

In addition, when the deep learning-based autonomous driving control output value corresponds to a steering or acceleration/deceleration output control less than a predetermined minimum time to collision (TTC), the deep learning error determination processor 130 may stop the steering or acceleration/deceleration output control less than TTC. In other words, the minimum TIC refers to the Maginot line for preventing a collision, and when the minimum TTC is not satisfied, there may be a risk of collision. Thus, by preventing the steering control less than the predetermined minimum TTC, an accident or the like may be avoided.

In addition, when the deep learning-based autonomous driving control output value corresponds to a steering value greater than a predetermined steering reference value, the deep learning error determination processor 130 may adjust the steering value to be less than the steering reference value or may stop the steering control. In other words, when the excessive steering value is instantaneously output, the subject vehicle may be tilted or the like, and thus stability in posture control may be degraded. Thus, when the deep learning-based autonomous driving control output value corresponds to the steering value greater than the predetermined steering reference value, the steering control may be stopped or the steering value may be adjusted to be less than the steering reference value.

When the deep learning-based autonomous driving control output value corresponds to an acceleration/deceleration value greater than a predetermined acceleration/deceleration reference value, the deep learning error determination processor 130 may adjust the acceleration/deceleration value to be less than the acceleration/deceleration reference value or may stop the acceleration/deceleration control. In other words, the excessive acceleration/deceleration value is instantaneously output, the posture of the subject vehicle may be unstable or passengers may feel uncomfortable. Thus, when the deep learning-based autonomous driving control output value exceeding the predetermined acceleration/deceleration reference value is output, the acceleration/deceleration value may be adjusted to be less than the acceleration/deceleration reference value or the acceleration/deceleration control may be stopped.

When the deep learning-based autonomous driving control output value corresponds to an output value for a steering control in a direction departing from a lane, the deep learning error determination processor 130 may stop the steering control. In other words, while the subject vehicle is running on a last lane, i.e., a leftmost lane or a rightmost lane, if the deep learning-based autonomous driving control output value for a steering control in the direction departing from the lane (the direction in which there is no lane) is output, the deep learning error determination processor 130 may recognize its lane number and prevent the steering control, and thus, an accident caused by the vehicle driving in the direction in which there is no lane may be avoided.

The autonomous driving control processor 140 may perform the autonomous vehicle control using the final autonomous driving control output value output from the deep learning error determination processor 130.

The non-transitory computer-readable storage medium 200 may store the parameters for the deep learning-based autonomous driving control and the expert rule-based autonomous driving control that are performed by the processor 100, and may store a deep learning error that is determined when the determination of the expert rule-based autonomous driving control is different from the determination of the deep learning-based autonomous driving control.

To this end, the non-transitory computer-readable storage medium 200 includes a deep learning storage 210, an expert rule storage 220, and an error storage 230.

The deep learning storage 210 may store a deep learning-based output control parameter for determination of deep learning-based autonomous driving control. For example, the deep learning storage 210 may store the deep learning-based output control parameters as shown in table 1.

The expert rule storage 220 may store an expert rule. The expert rule includes at least one of limitations on steering direction with respect to free space, time to collision (TTC), the degree of change in steering, the degree of change in acceleration/deceleration, and lane departure.

The error storage 230 may store information about the deep learning error that is determined and corrected by the deep learning error determination processor 130. By storing the deep learning error information and applying the deep learning error information to the deep learning-based autonomous driving control, reliability of the deep learning-based autonomous vehicle control system may be improved.

Figure 2A:
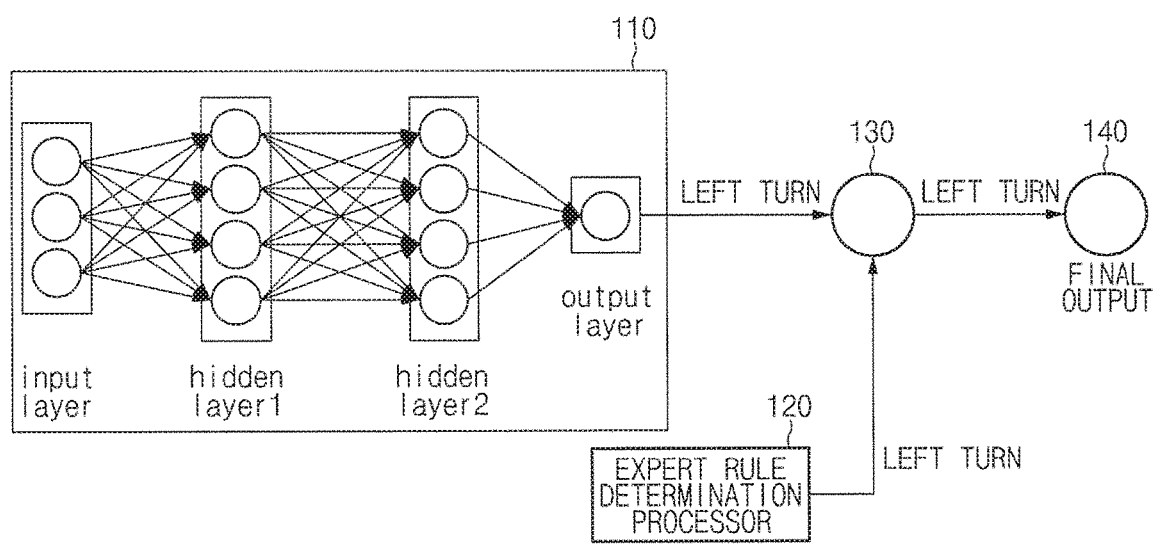
FIG. 2A illustrates an example of autonomous vehicle control when a deep learning-based driving direction control output value and an expert rule-based driving direction control output value match, according to exemplary embodiments of the present disclosure.

FIG. 2A illustrates an example of autonomous vehicle control when a deep learning-based driving direction control output value and an expert rule-based driving direction control output value match, according to exemplary embodiments of the present disclosure. Referring to FIG. 2A, when the deep learning processor 110 outputs a left turn control signal, and the expert rule determination processor 120 also outputs a left turn control signal, the deep learning error determination processor 130 transmits the left turn control signal to the autonomous driving control processor 140 by which the vehicle is controlled to turn left.

Figure 2B:
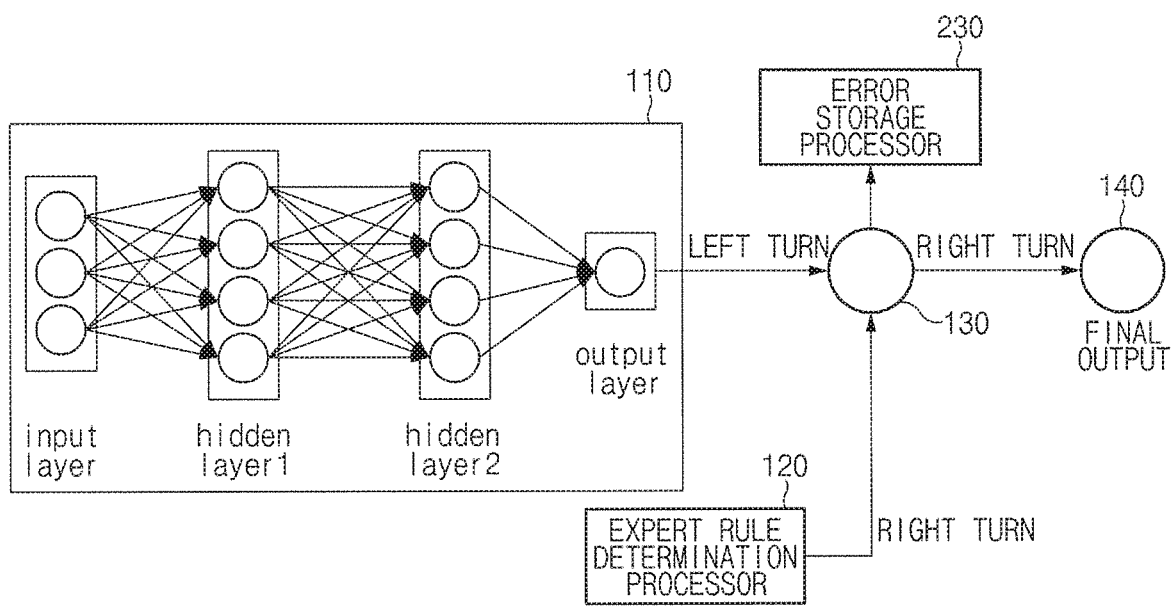
FIG. 2B illustrates an example of autonomous vehicle control when a deep learning-based driving direction control output value and an expert rule-based driving direction control output value do not match, according to exemplary embodiments of the present disclosure.

FIG. 2B illustrates an example of autonomous vehicle control when a deep learning-based driving direction control output value and an expert rule-based driving direction control output value do not match, according to exemplary embodiments of the present disclosure. Referring to FIG. 2B, when the deep learning processor 110 outputs a left turn control signal, and the expert rule determination processor 120 outputs a right turn control signal, the output of the deep learning processor 110 is different from the output of the expert rule determination processor 120, and thus, the deep learning error determination processor 130 transmits the right turn control signal that is output from the expert rule determination processor 120 to the autonomous driving control processor 140 by which the vehicle is controlled to turn right, and the error storage 230 stores information that the output of the deep learning processor 110 is different from the output of the expert rule determination processor 120.

Figure 3A:
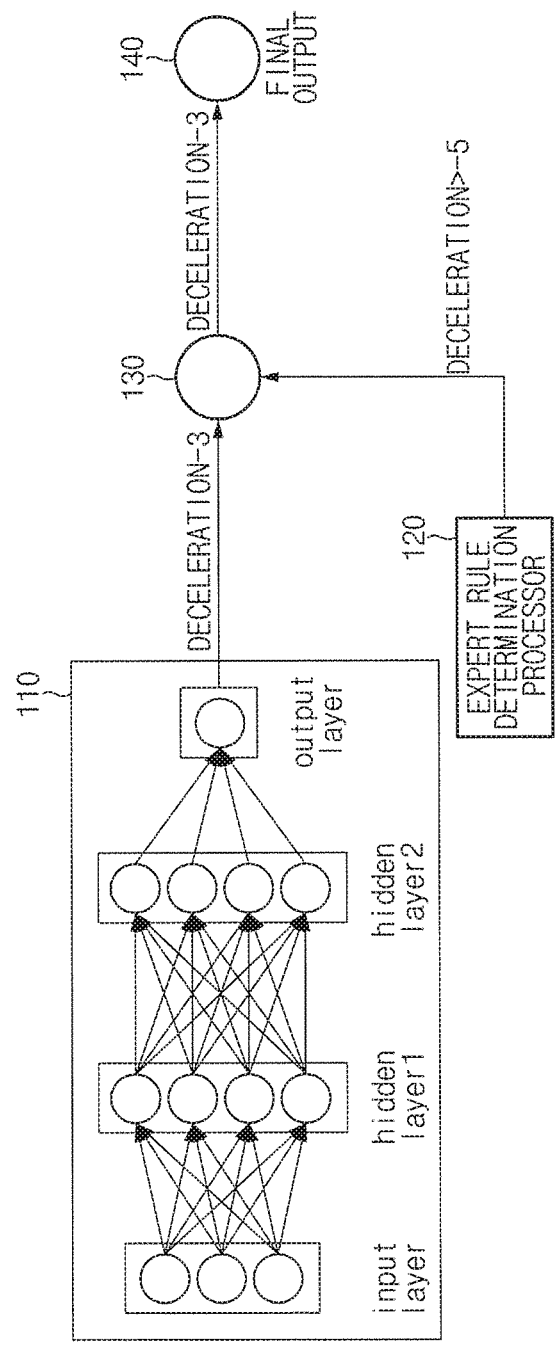
FIG. 3A illustrates an example of autonomous vehicle control when a deep learning-based vehicle speed control output value and an expert rule-based vehicle speed control output value match, according to exemplary embodiments of the present disclosure.

FIG. 3A illustrates an example of autonomous vehicle control when a deep learning-based vehicle speed control output value and an expert rule-based vehicle speed control output value match, according to exemplary embodiments of the present disclosure. Referring to FIG. 3A, when the deep learning processor 110 outputs a control signal for third stage deceleration (deceleration−3), and the expert rule determination processor 120 outputs a control signal within fifth stage deceleration (deceleration>−5), the third stage deceleration control of the deep learning processor 110 is within the fifth stage deceleration control of the expert rule determination processor 120, and thus, the deep learning error determination processor 130 transmits the third stage deceleration (deceleration-3) control signal that is output from the deep learning processor 110 to the autonomous driving control processor 140 by which the vehicle is controlled to perform the third stage deceleration.

Figure 3B:
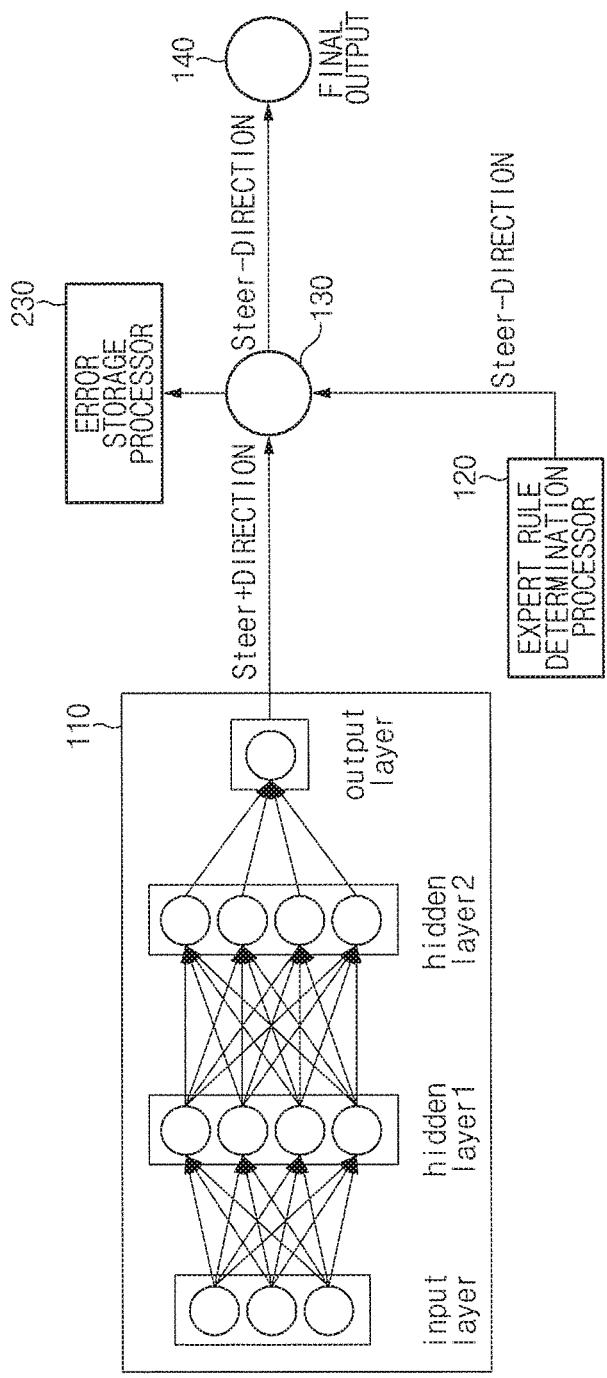
FIG. 3B illustrates an example of autonomous vehicle control when a deep learning-based steering control output value and an expert rule-based steering control output value do not match, according to exemplary embodiments of the present disclosure.

FIG. 3B illustrates an example of autonomous vehicle control when a deep learning-based steering control output value and an expert rule-based steering control output value do not match, according to exemplary embodiments of the present disclosure. Referring to FIG. 3B, when the deep learning processor 110 outputs a control signal for + (plus) steering direction, and the expert rule determination processor 120 outputs a control signal for − (minus) steering direction, the output of the deep learning processor 110 is different from the output of the expert rule determination processor 120, and thus, the deep learning error determination processor 130 transmits the control signal for − steering direction that is output from the expert rule determination processor 120 to the autonomous driving control processor 140 by which the vehicle is controlled to drive in the − steering direction, and the error storage 230 stores information that the output of the deep learning processor 110 is different from the output of the expert rule determination processor 120.

Hereinafter, an expert rule setting method, according to exemplary embodiments of the present disclosure, will be described with reference to FIG. 4. An autonomous vehicle control system, according to exemplary embodiments of the present disclosure, may set a deep learning architecture in S110, and may set a deep learning-based output control parameter in S120. Here, the setting of the deep learning architecture refers to setting the number of hidden layers, the number of convolutional neural networks (CNNs), and the like, and the output control parameter refers to an output control value for autonomous vehicle control. Then, the autonomous vehicle control system may set an expert rule selected by a user or provided by an expert in S130.

Figure 4:
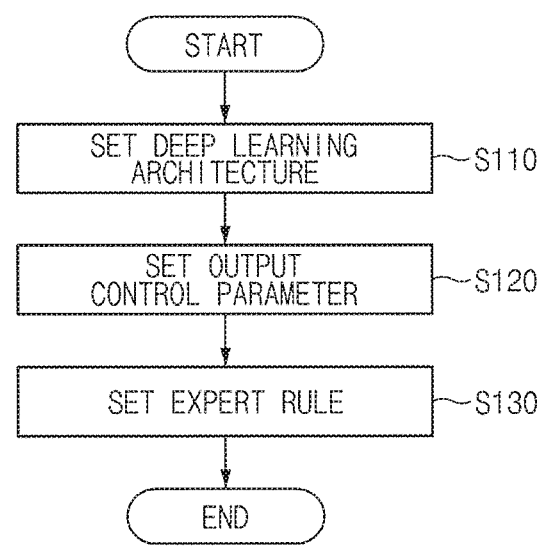
FIG. 4 illustrates a flowchart of an expert rule setting method, according to exemplary embodiments of the present disclosure.

Here, the process in FIG. 4 of setting the deep learning architecture, the output control parameter, and the expert rule may be initially performed prior to deep learning-based autonomous driving.

Figure 5:
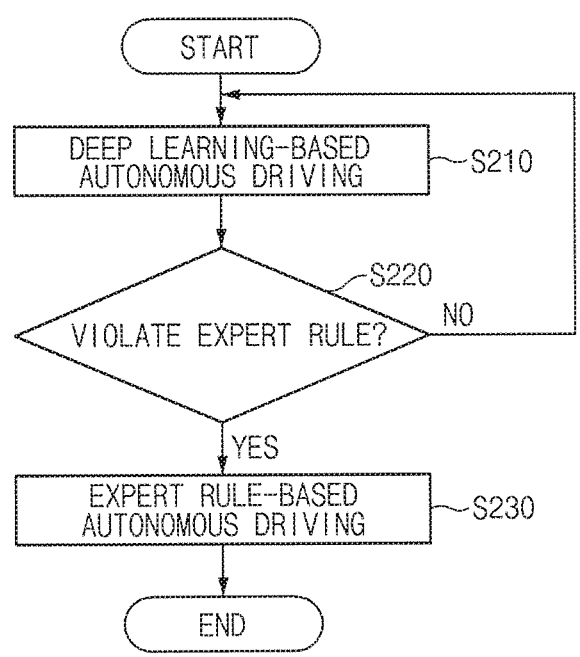
FIG. 5 illustrates a flowchart of an autonomous vehicle control method, according to exemplary embodiments of the present disclosure.

Hereinafter, an autonomous vehicle control method, according to exemplary embodiments of the present disclosure, will be described with reference to FIG. 5.

First of all, while a deep learning-based autonomous vehicle control system is automatically driving based on deep learning in S210, the system may compare a deep learning-based autonomous driving control output value with an expert rule-based autonomous driving control output value, and when the deep learning-based autonomous driving control output value and the expert rule-based autonomous driving control output value do not match, the system may determine that the deep learning-based autonomous driving control output value violates the expert rule in S220.

When the deep learning-based autonomous driving control output value violates the expert rule, the autonomous driving may be performed on the basis of the expert rule-based autonomous driving control output value, irrespective of the deep learning-based autonomous driving control output value, in S230.

As described above, by applying the predetermined expert rule to the deep learning-based autonomous driving, an error that may occur in determination of the deep learning-based autonomous driving control may be minimized, and by preventing the deep learning-based erroneous determination from continuously being learned as a correct determination and updating information about the erroneous determination, the reliability of the deep learning-based autonomous vehicle control system may be improved.

Figure 7:
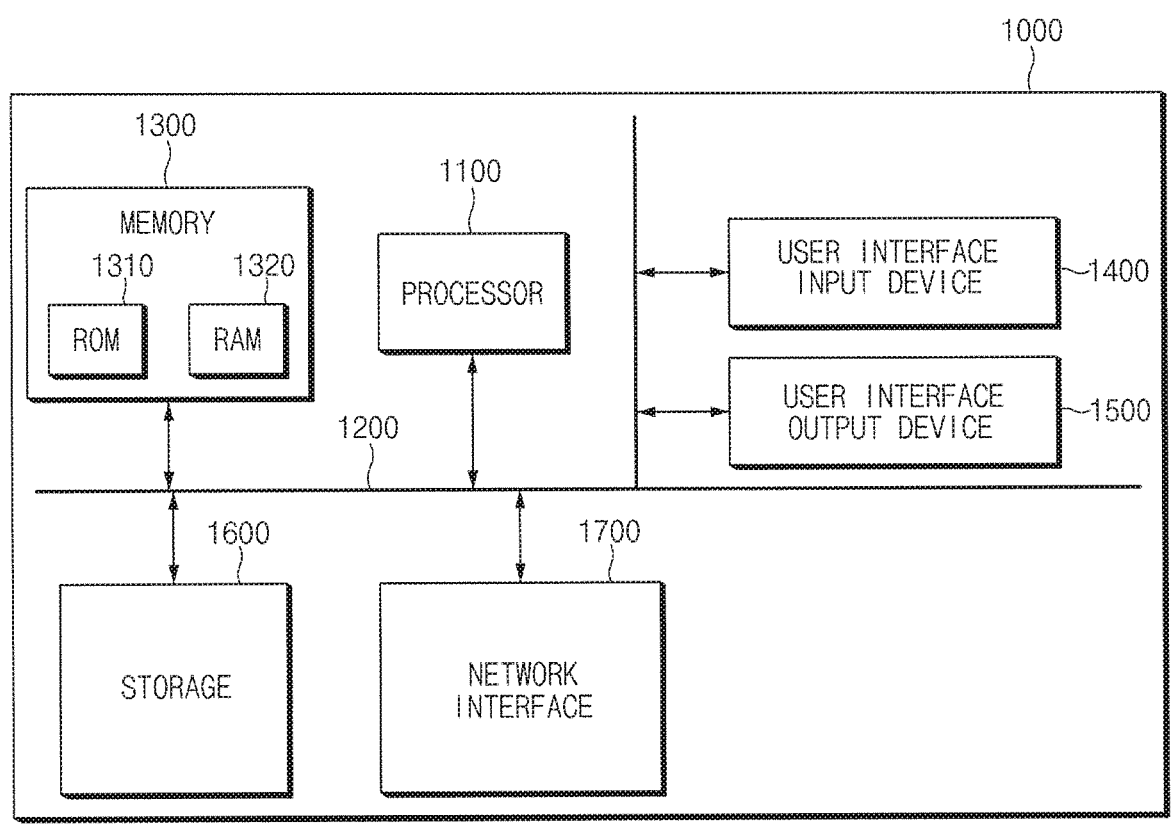
FIG. 7 illustrates the configuration of a computing system by which an autonomous vehicle control method according to exemplary embodiments of the present disclosure is executed.

FIG. 7 illustrates the configuration of a computing system by which an autonomous vehicle control method according to exemplary embodiments of the present disclosure is executed.

Referring to FIG. 7, a computing system 1000 includes at least one processor 1100, a bus 1200, a memory 1300, a user interface input device 1400, a user interface output device 1500, a storage 1600, and a network interface 1700, wherein these elements are connected through the bus 1200.

The processor 1100 may be a central processing unit (CPU) or a semiconductor device processing commands stored in the memory 1300 and/or the storage 1600. The memory 1300 and the storage 1600 include various types of volatile or non-volatile storage media. For example, the memory 1300 includes a read only memory (ROM) and a random access memory (RAM).

Therefore, the steps of the method or algorithm described in connection with the exemplary embodiments disclosed herein may be implemented directly by a hardware module or a software module that is executed by the processor 1100, or a combination of both. The software module may reside in storage media, i.e., the memory 1300 and/or the storage 1600, such as RAM, a flash memory, ROM, an erasable programmable read-only memory (EPROM), an electrically erasable programmable read-only memory (EEPROM), a register, a hard disk, a removable disk, and a CD-ROM.

The exemplary storage media may be coupled to the processor 1100, such that the processor 1100 may read information from the storage media and write information to the storage media. Alternatively, the storage media may be integrated with the processor 1100. The processor 1100 and the storage media may reside in an application specific integrated circuit (ASIC). The ASIC may reside in a user terminal. Alternatively, the processor 1100 and the storage media may reside as individual components in a user terminal.

As set forth above, by applying a predetermined expert rule to deep learning-based autonomous vehicle control, an error in deep learning-based autonomous vehicle control may be prevented, and by updating information about the error, the reliability of the deep learning-based autonomous vehicle control system may be improved, and thus safe driving may be achieved to enhance the user convenience.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A deep learning-based autonomous vehicle control system, comprising:
    a processor configured to determine an autonomous driving control based on deep learning, to correct an error in determination of a deep learning-based autonomous driving control based on determination of an autonomous driving control based on a predetermined expert rule, and to control an autonomous vehicle; and
    a non-transitory computer-readable storage medium storing data for the determination of the deep learning-based autonomous driving control, data for the determination of the expert rule-based autonomous driving control, and information about the error in the determination of the deep learning-based autonomous driving control,
wherein the processor is further configured to:
output a deep learning-based autonomous driving control output value for the deep learning-based autonomous driving control;
output an expert rule-based autonomous driving control output value based on the expert rule; and
compare the deep learning-based autonomous driving control output value with the expert rule-based autonomous driving control output value and output a final autonomous driving control output value depending on a comparison result,
wherein when the deep learning-based autonomous driving control output value corresponds to a steering direction control in a direction in which there is no free space, the processor corrects the steering direction control to a direction in which there is a free space.

2. The deep learning-based autonomous vehicle control system according to claim 1, wherein the processor outputs the deep learning-based autonomous driving control output value as the final autonomous driving control output value when the deep learning-based autonomous driving control output value and the expert rule-based autonomous driving control output value match.

3. The deep learning-based autonomous vehicle control system according to claim 1, wherein the predetermined expert rule includes at least one of limitations on a steering direction with respect to a free space, a time to collision (TTC), a degree of change in steering, a degree of change in acceleration/deceleration, and a lane departure.

4. The deep learning-based autonomous vehicle control system according to claim 1, wherein when the deep learning-based an autonomous driving control output value corresponds to a steering or acceleration/deceleration output control less than a predetermined minimum time to collision (TTC), the processor stops the steering or acceleration/deceleration output control less than the predetermined minimum TTC.

5. The deep learning-based autonomous vehicle control system according to claim 1, wherein when the deep learning-based autonomous driving control output value corresponds to a steering value greater than a predetermined steering reference value, the processor adjusts the steering value to be less than the steering reference value.

6. The deep learning-based autonomous vehicle control system according to claim 1, wherein when the deep learning-based autonomous driving control output value corresponds to an acceleration/deceleration value greater than an acceleration/deceleration reference value, the processor adjusts the acceleration/deceleration value to be less than the acceleration/deceleration reference value.

7. The deep learning-based autonomous vehicle control system according to claim 1, wherein when the deep learning-based autonomous driving control output value corresponds to an output value for a steering control in a direction departing from a lane, the processor stops the steering control.

8. The deep learning-based autonomous vehicle control system according to claim 1, wherein the processor further configured to control the autonomous vehicle using the final autonomous driving control output value.

9. The deep learning-based autonomous vehicle control system according to claim 1, wherein the deep learning-based autonomous driving control output value includes at least one of a relative speed between a preceding vehicle and a subject vehicle, a relative distance between the preceding vehicle and the subject vehicle, a free space on a neighboring lane, a distance to a left lane, a distance to a right lane, a lane number of a lane on which the subject vehicle is currently driving, and an angle between a lane and the subject vehicle.

10. The deep learning-based autonomous vehicle control system according to claim 1, wherein the non-transitory computer-readable storage medium comprises:
a deep learning storage storing a deep learning-based output control parameter for the determination of the deep learning-based autonomous driving control;
an expert rule storage storing the predetermined expert rule; and
an error storage storing the information about the error that is determined and corrected by the processor.

11. A deep learning-based autonomous vehicle control device, comprising a processor configured to:
output a deep learning-based autonomous driving control output value for a deep learning-based autonomous driving control;
output an expert rule-based autonomous driving control output value based on an expert rule;
compare the deep learning-based autonomous driving control output value with the expert rule-based autonomous driving control output value and output a final autonomous driving control output value depending on a comparison result; and
control an autonomous vehicle using the final autonomous driving control output value,
wherein when the deep learning-based autonomous driving control output value corresponds to a steering direction control in a direction in which there is no free space, the processor corrects the steering direction control to a direction in which there is a free space.

12. The deep learning-based autonomous vehicle control device according to claim 11, wherein the processor outputs the deep learning-based autonomous driving control output value as the final autonomous driving control output value when the deep learning-based autonomous driving control output value and the expert rule-based autonomous driving control output value match.

13. A deep learning-based autonomous vehicle control method, comprising steps of:
outputting, by a processor, a deep learning-based autonomous driving control output value for a deep learning-based autonomous driving control;
outputting, by the processor, an expert rule-based autonomous driving control output value based on an expert rule;
comparing, by the processor, the deep learning-based autonomous driving control output value with the expert rule-based autonomous driving control output value and outputting a final autonomous driving control output value depending on a comparison result; and
controlling, by the processor, an autonomous vehicle using the final autonomous driving control output value,
wherein the step of outputting a final autonomous driving control output value comprises correcting a steering direction control to a direction in which there is a free space, when the deep learning-based autonomous driving control output value corresponds to a steering direction control in a direction in which there is no free space.

14. The deep learning-based autonomous vehicle control method according to claim 13, wherein the step of outputting the final autonomous driving control output value comprises outputting the deep learning-based autonomous driving control output value as the final autonomous driving control output value when the deep learning-based autonomous driving control output value and the expert rule-based autonomous driving control output value match.

15. The deep learning-based autonomous vehicle control method according to claim 13, wherein the expert rule includes at least one of limitations on steering direction with respect to a free space, a time to collision (TTC), a degree of change in steering, a degree of change in acceleration/deceleration, and a lane departure.

16. The deep learning-based autonomous vehicle control system according to claim 1, wherein the processor outputs the expert rule-based autonomous driving control output value as the final autonomous driving control output value unless the deep learning-based autonomous driving control output value and the expert rule-based autonomous driving control output value match.

17. The deep learning-based autonomous vehicle control device according to claim 12, wherein the processor outputs the expert rule-based autonomous driving control output value as the final autonomous driving control output value unless the deep learning-based autonomous driving control output value and the expert rule-based autonomous driving control output value match.

18. The deep learning-based autonomous vehicle control method according to claim 14, wherein the step of outputting the final autonomous driving control output value comprises outputting the expert rule-based autonomous driving control output value as the final autonomous driving control output value unless the deep learning-based autonomous driving control output value and the expert rule-based autonomous driving control output value match.

* * * * *